United States Patent [19]
Bunger

[11] 3,918,404
[45] Nov. 11, 1975

[54] PROCESS AND APPARATUS FOR INHIBITING GENERATION OF AMMONIA AND OTHER NOXIOUS GASES AND THE PREVENTION OF ODOR IN CONCENTRATED FEEDLOT FACILITIES

[76] Inventor: Richard E. Bunger, 5202 E. Washington St., Phoenix, Ariz. 85018

[22] Filed: Apr. 11, 1974

[21] Appl. No.: 459,905

[52] U.S. Cl. ............................................... 119/28
[51] Int. Cl.² ....................... A01K 1/00; C02B 1/18
[58] Field of Search ............ 119/16, 22, 28; 210/59, 210/62; 21/55, 58

[56] References Cited
UNITED STATES PATENTS

| | | | |
|---|---|---|---|
| 2,703,312 | 3/1955 | Hann et al. ...................... | 210/59 X |
| 3,137,270 | 6/1964 | Rigterink et al. ..................... | 119/16 |
| 3,225,739 | 12/1965 | Brodrick ........................... | 119/28 X |
| 3,458,029 | 7/1969 | Allen et al. ........................ | 119/22 X |
| 3,801,501 | 4/1974 | Kennedy .............................. | 210/59 |

*Primary Examiner*—Hugh R. Chamblee
*Attorney, Agent, or Firm*—Warren F. B. Lindsley

[57] ABSTRACT

A process for inhibiting the generation of ammonia through the control of the pH in animal excreta under the slotted floors of animal enclosures and for the reduction of odors and noxious gases through the utilization of ozone as an oxidizing agent for the destruction of bacteria associated with the production of hydrogen sulphide and other objectionable products of waste decomposition.

21 Claims, 4 Drawing Figures

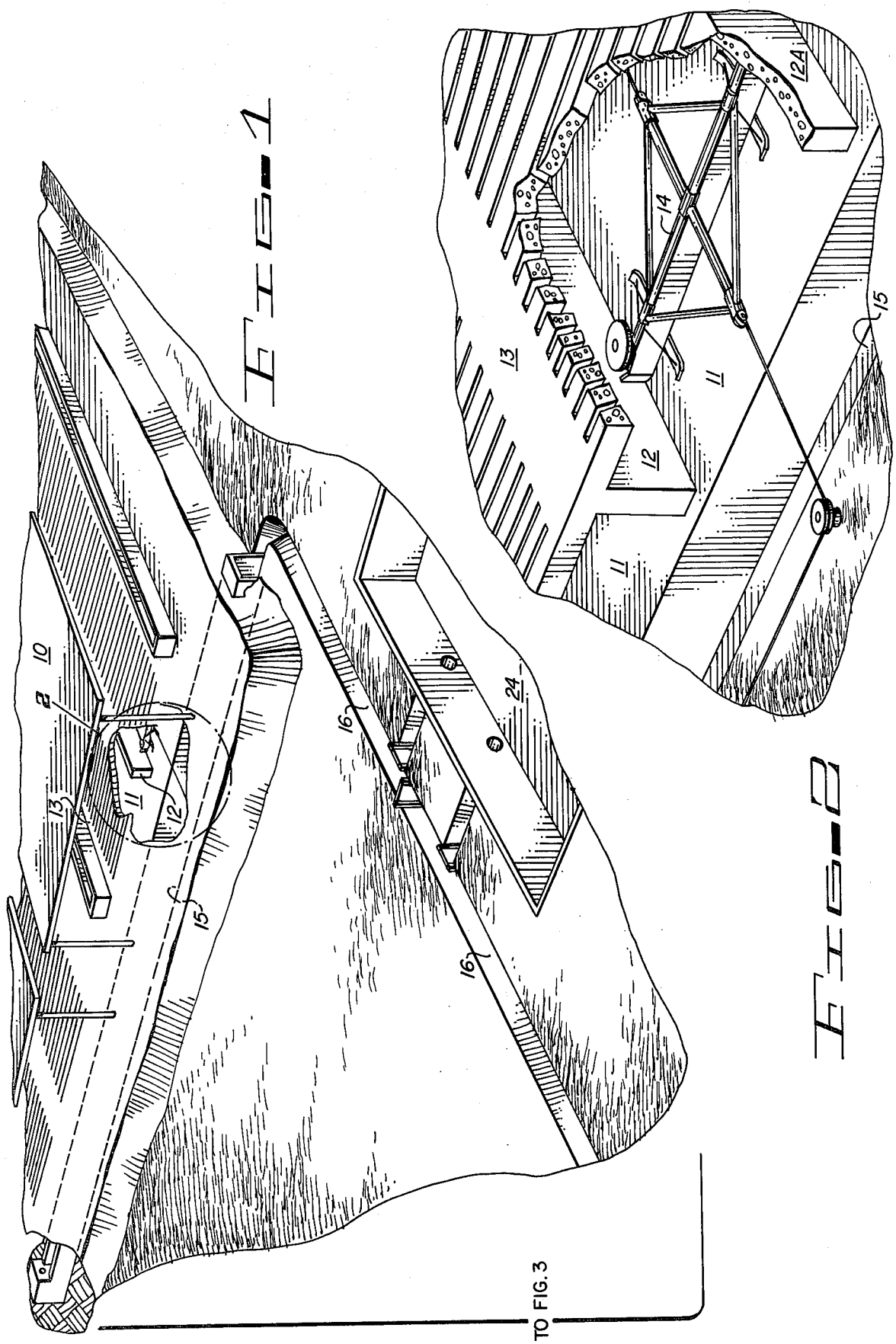

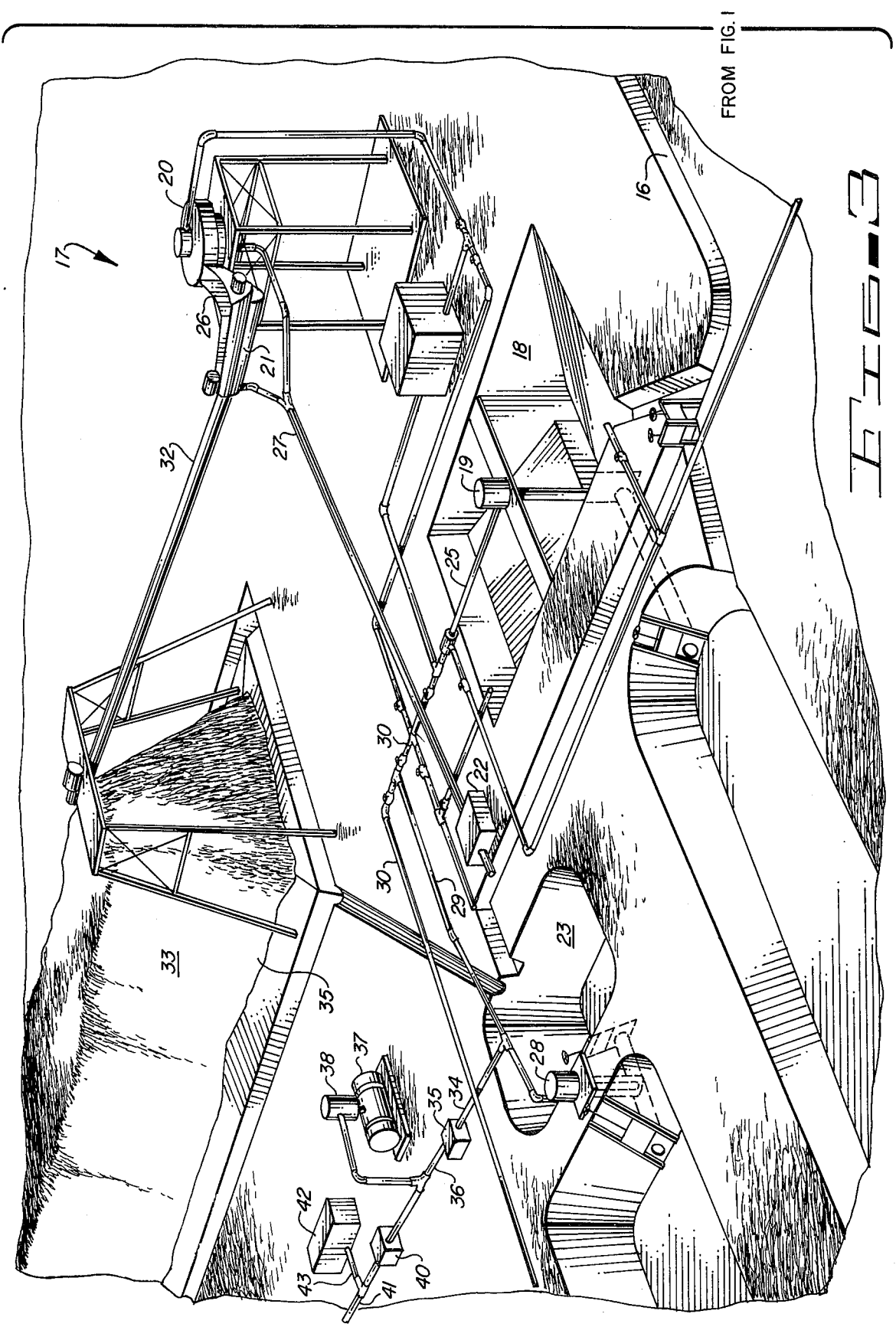

PROCESS AND APPARATUS FOR INHIBITING GENERATION OF AMMONIA AND OTHER NOXIOUS GASES AND THE PREVENTION OF ODOR IN CONCENTRATED FEEDLOT FACILITIES

BACKGROUND OF THE INVENTION

The use of commercial feedlots for the fattening of cattle was introduced only a few years ago, but because of the relative profitability of this approach, it has rapidly grown in popularity and now completely dominates the cattle-fattening industry. Large numbers of cattle running to the thousands and tens of thousands are brought to these lots where they are concentrated in relatively close quarters.

The problems associated with these feedlots have grown at the same rate, however, and now represent a major national concern. The odors produced by the lots have created serious problems, especially when the feedlots have been located near population centers. Waste materials carried into the soil by rainwater runoff threaten pollution of ground water and pose a serious health hazard to the surrounding communities. The accumulation of manure at the feedlots is also a hazard to the health of the cattle themselves because of the contamination of the air and because it attracts flies and other insects.

One of the chief contaminants which has been found to be detrimental to the health of the animals is the ammonia generated by the animal excreta. The harmful effects of ammonia have been reported from many sources.

Dr. Willard J. Visek, professor of nutrition and comparative metabolism, Cornell University, reports evidence that high $NH_3$ in the bowels of man due to meat consumption causes increased virus infections. He also states that there is a correlation between animal protein intake and intestinal cancer mortality. Liver tumors produced in animals by known cancer-producing agents can be significantly reduced by feeding amino acids which reduce tissue ammonia concentrations.

Tests performed in a large fattening stable near Temesvar, Roumania (October, 1970 through May, 1971) showed a marked decrease in performance when the ammonia content of the atmosphere in the stable was high. A direct relationship was seen between too high concentrations of toxic gases within the building and the development of disease and the severity of the signs of the diseases which were mainly respiratory disorders. High ammonia levels gave rise to new infections. On the basis of these observations, it was suggested that ammonia is the most harmful atmospheric contaminant in cattle-fattening stalls.

In the United States, it has been observed that animals confined within crowded feeding quarters in which high concentrations of ammonia are prevalent give evidence of harmful effects such as coughing, runny noses and general distress resulting in loss of appetite. Animals in such confined quarters exhibit a somewhat higher bacteria count on nasal swabs than those in open earth floor pens, possibly because ammonia or some other vapor is interfering with nature by preventing anti-body functions, thereby lowering resistance to disease.

Much progress has been made toward improved sanitation in such large cattle-fattening operations. Various processes for the handling and treatment of the animal wastes have been proposed and investigated, some of which provide for the recovery and re-feeding of residual protein value from the animal excreta. Removal of the animal excreta from the crowded animal quarters has been facilitated by the use of enclosures with slotted concrete floors. The manure is collected in pits under the floors and is moved from the pits into a drainage trench by means of large scrapers or "drags" with the aid of water flushing.

While such innovations have reduced the waste-handling operations to manageable proportions, there are still serious problems to be solved, particularly in connection with the control of noxious and toxic gases such as ammonia and hydrogen sulphide. In a typical slotted floor structure, ammonia concentrations have been measured ranging from 20 to 80 parts per million at the slot level. At the animals' nose level (approximately 30 inches above the slots) the ammonia concentrations were approximately 50 percent of the values measured at the slots. Temperature was found to have a significant effect, the amount of ammonia generated being increased 2½ to 3 times by an increase in temperature from 75° to 100° F. The levels of ammonia concentrations measured in the slotted floor structures are significantly higher than in earth floor enclosures for which measured concentrations of 5 to 8 parts per million have been found.

SUMMARY OF THE INVENTION

Recent studies have provided additional insight into the mechanisms affecting the evolution of ammonia from animal excreta.

It has been determined that the pH of the manure and urine mixture has a direct relationship to the amount of ammonia generated.

The pH level is a number indicating the alkalinity or acidity of a solution and is defined as "the negative logarithm of the effective hydrogen-ion activity in gram equivalents per liter used in expressing both acidity and alkalinity on a scale whose values run from zero to 14 with seven representing neutrality. Numbers less than seven increase acidity, and numbers greater than seven increase alkalinity." (Webster's Seventh New Collegiate Dictionary). A greater evolution of ammonia results if a base such as lime is added while the addition of a mild acid such as $FeCl_3$ or $H_2SO_4$ in sufficient quantities to reduce the pH to five or six causes the ammonia to be held in solution or not generated.

The principle source of ammonia from bovine excreta is through hydrolysis of urea which is present in the urine. Additionally, ammonia may be produced by the degradation of proteins in the fecal excretions with subsequent deamination of the resulting amino acids. A small additional contribution to the total ammonia production may be made by deamination of certain amines, such as indole and skatole, which are normally present in the fecal excretion.

The relative merits of various chemical additives to reduce and control the pH of the animal waste slurry have been evaluated.

Muriatic acid (HCl) may be used to control ammonia generation through the reduction of pH; it is also highly effective as an agent for destroying bacteria, some of which are active in the generation of other toxic and noxious gases such as hydrogen sulphide. Muriatic acid has the disadvantage, however, that it is highly corrosive to concrete.

Sulphuric acid is equally effective in the reduction of pH. It is also considerably less expensive than muriatic or hydrochloric acid and is much less corrosive to concrete, but it does not kill the bacteria associated with the generation of other gases.

Ozone, which is a strong and inexpensive oxidizing agent, is ineffective in controlling ammonia generation, but it is highly effective in the destruction of other bacteria.

Accordingly, it is one objection of this invention to provide an improved waste processing system.

Another object of this invention is to provide a new and improved waste processing system for use in conjunction with livestock feedlots.

A further object of this invention is to provide a waste processing system in which the generation of ammonia is held to very low levels that are not a hazard to the health or comfort of the livestock or to humans in the feedlot areas.

A still further object of this invention is to provide a waste processing system that is substantially odor-free.

A still further object of this invention is to provide a waste processing system which limits the generation of ammonia by regulating the pH of the animal excreta beds to appropriate values at which the ammonia is not generated or held in solution.

A still furhter object of this invention is to provide a waste processing system which controls the pH of the animal excreta beds for the limitation of ammonia generation by the addition of an appropriate acidifier such as sulphuric acid.

A still further object of this invention is to provide an improved waste processing system which, in addition to limiting ammonia generation through pH control, utilizes ozone gas as a means for destroying harmful bacteria and preventing objectionable odors around the feedlot areas.

A still further object of this invention is to provide a waste processing system which prevents excessive ammonia generation and prevents objectionable odors through a process which does not hinder the further processing of the animal excreta mixture for protein recovery and re-feeding to the cattle or other livestock.

A still further object of this invention is to provide a waste processing system which prevents excessive ammonia generation and prevents objectionable odors through the addition of chemicals which are not unduly corrosive to the concrete pits containing the animal excreta.

A still further object of this invention is to provide such an improved waste handling system which is inexpensive to install and operate.

Yet another object of this invention is to provide such an improved waste handling system which is fully atuomatic and safe and requires a minimum of supervision and maintenance.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a partial diagrammatic view of a feedlot for animals and an animal waste removal system therefor.

FIG. 2 is an enlarged view of one part of the structure shown in FIG. 1 illustrating a scraping system for waste removal from the feedlot.

FIG. 3 is a pictorial illustration of an embodiment of part of the waste processing system disclosed.

DESCRIPTION OF THE PREFERRED EMBODIMENT

Figure 4:
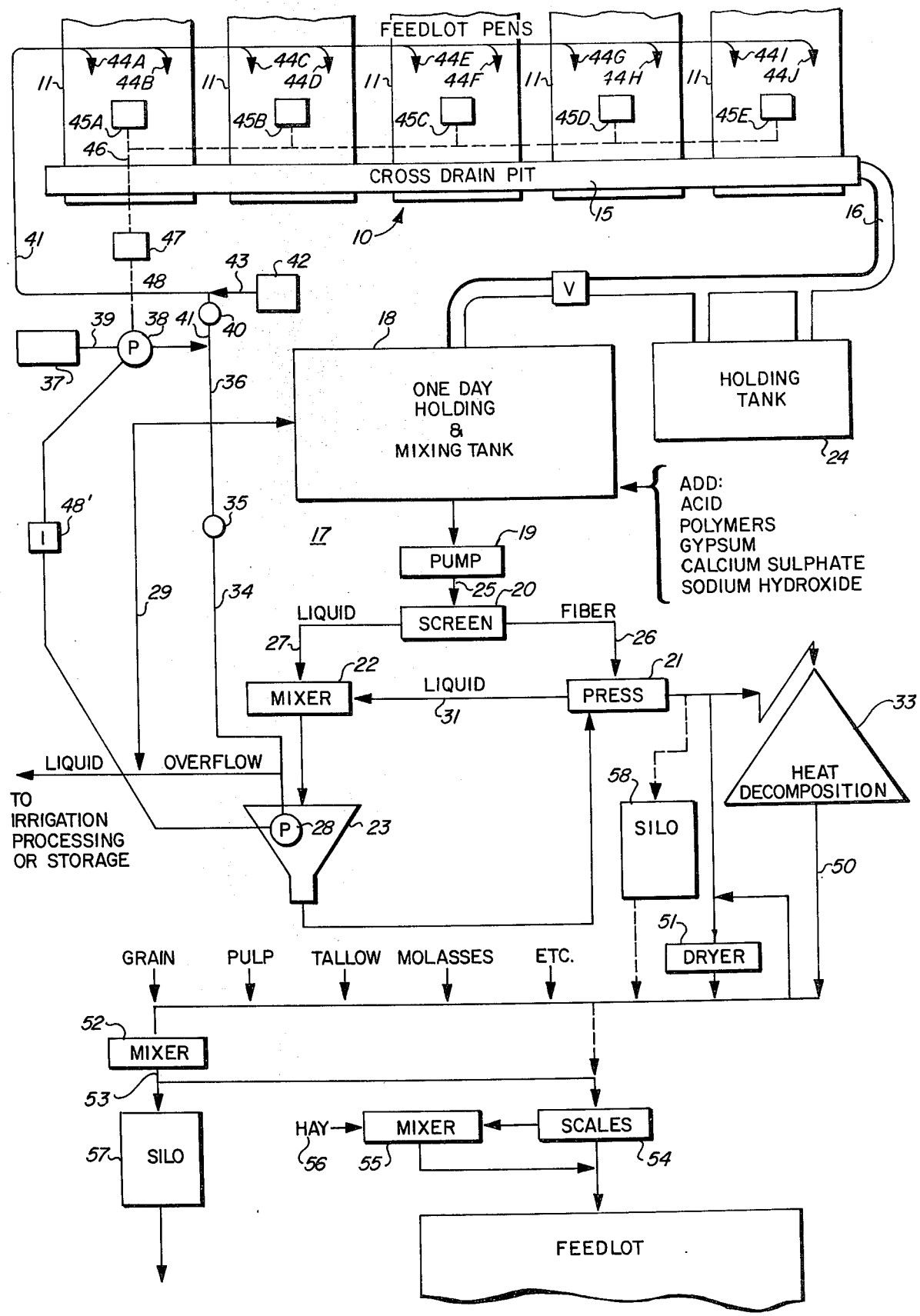
FIG. 4 is a diagrammatic illustration of one embodiment of the complete waste processing system.

Referring more particularly to the drawings by characters of reference, FIG. 1 discloses diagrammatically a slotted floor enclosure 10 for feeding animals, such as for example, cattle. The enclosure is formed over trenches 11 which are lined by pairs of spaced apart vertically arranged walls 12 and 12A, more clearly shown in FIG. 2, which support floor panels 13 in a grate or slot-like configuration on their upper surfaces.

The walls are parallelly arranged so that a suitable drag type waste scraping means 14 may be operably positioned therebetween to move longitudinally thereof to periodically remove the waste from the trenches. The animals penned upon the slotted floors of the feedlot continuously move their feet over the top surfaces of the floors of the pen and by their action scrape their waste into the pits below the floor. Although enclosure 10 is shown as having floor panels 13 providng a plurality of slots extending laterally of the longitudinal axis of the enclosure, the floor of the enclosure may have one or more slots running longitudinally of the enclosure in lieu thereof.

Since the waste is periodically scraped from the pits or from the top of a slurry maintained on the bottom of the pits, such as for example, three times a day, the animal waste remains moist when it is scraped into the cross drain pit 15. This drain is preferably below the level of the trench so that the scrapings from the scraping means 14 may be easily moved into the pit. By periodically obtaining the fresh animal waste within a few hours after it is expelled from the livestock, the animal waste not only remains moist but also still retains a maximum amount of its valuable organic and inorganic nutrients such as protein, starches, sugars, fats, carbohydrates, phosphates, sulphur, potassium, etc. It is well known that biological degradation of the organic nutrients proceed at a rapid rate, destroying useful and available nutrient values. Therefore, this invention enables high nutrient recovery because of the rapid processing of waste in hours rather than months as in conventional practice.

The cleaning efficiency and the odor control effectiveness of the cleaning system disclosed may be enhanced in this application through the utilization of an aerated flushing action. Although this function may dissipate some of the valuable nutrients, it may be useful in some instances. The drain pit 15 may be considered a special adaptation of an oxidation ditch. Animal wastes are deposited in the canal or pit by the cleaning mechanisms comprising scraping means 14 aided by a water flushing action. The solids of the waste carried by the water are held in suspension by the sustained velocity of the water and odor is controlled by aeration of the water which promotes the aerobic decomposition and reduction of biochemical oxygen demand, particularly of the liquid portion of the waste materials, as they are circulated within the canal or drain pit 15 prior to delivery as effluent via an exit canal branch 16 to a waste separator subsystem 17.

The water added for the flushing action may be additional liquid to the system or it may be recycled effluent from a closed system as hereinafter explained. This additional liquid in the presence of vigorous agitation causes the microsize particles which are connected to the fibers in the animal waste to loosen allowing them to pass through a screen in separator subsystems 17.

Separator subsystem 17, as shown in FIGS. 3 and 4, comprises a 1-day holding and mixing tank 18 having a pump 19, vibrating screening apparatus 20, press 21, mixer (not shown) and a settling tank 23. If it is desirable to shut the waste handling system down, the scraping and waste removal may continue with the waste being stored in a holding tank 24 shown in FIGS. 1 and 4.

The effluent delivered to tank 18 and pump 19 via canal branch 16 may be combined in tank 18 with a number of chemical additives including acids for control of pH factor and improved lignin decomposition, gypsum, polymer and calcium sulphate to aid floculation, and sodium hydroxide to increase cell wall digestibility in proportions appropriate to the characteristics of the effluent.

The resulting mixture emanating from tank 18 and pump 19 is transmitted through pipe 25 and is deposited on vibrating screening apparatus 20 which separates fibrous matter from liquids, the fibers being delivered through conduit 26 to press 21 and the liquids being delivered through conduit 27 to mixer 22 where they may be combined with additional chemicals including varying amounts of polymer, gypsum and ammonia as appropriate to further promote the separation of solids and liquids in settling tank 23 which receives the output of mixer 22. The liquid output of settling tank 23 is delivered by pump 28 through pipe 29 to an irrigation system or to an irrigation storage facility (not shown) with an option for returning a small amount of liquid to tank 18 and pump 19 for any required dilution of effluent from the holding and mixing tank 18. The solids output of tank 23 is delivered to press 21, as shown in FIG. 4, where it is further de-watered along with the fiber output of screen 20. Press 21 returns its liquid output through conduit 31 to mixer 22 while its solid or fibrous output is carried by elevator 32 to the top entrance of a temperature-controlled tower (not shown) of a thermophilic or to the top fermenter shown, for example, as pile 33.

A part of the fluid from pump 28 is diverted through pipe 34 and pH sensor 35 into pipe 36. Sulphuric acid from acid storage tank 37 is pumped by means of acid pump 38 through pipe 39 into pipe 36 where it joins the fluid from pump 28, the mixture of acid and fluid passing from pipe 36 through pH sensor 40 into pipe 41. Ozone gas generated by an ozone generator 42 may selectively pass through pipe 43 to be mixed with the acid and fluid mixture in pipe 41. The mixture of fluid, acid and ozone gas flows through pipe 41 to the upstream end of feedlot pits 11 where it is discharged into the pits through ports 44A–44J.

A set of submersible pH sensors 45A–45E sense the pH of the waste slurry in pits 11 which is a mixture of animal excreta with the fluid return from pump 28 along with the acid from tank 37 and the ozone from generator 42 if the ozone is connected into the system. A key feature of this invention involves the control of the pH of the slurry between 5.5 and 6 which is a weak acid condition for which substantially little or no ammonia is generated or given off by the waste slurry. The required degree of acidity or the appropriate pH level is governed by the atmospheric and slurry temperature. There is a considerably higher ammonia vapor pressure associated with a slurry temperature of 100° F, for example, than with a temperature of 75° F. Tests have indicated that the rate of ammonia generation from untreated animal excreta is 2½ to 3 times as great at 100° F as it is at 75° F. The animal ration and the amount of fluids associated with the waste slurry also affect the amount of acid and the degree of acidity required to suppress the ammonia generation.

All of these factors and considerations must be taken into acount along with the determination of the maximum level of ammonia concentration that can be tolerated in or around the feedlot pens consistent with the health and comfort of the animals and the attending humans. Accordingly, the control of the pH level as determined by these requirements must be handled carefully through a continuous monitoring and control system which senses the pH level in the pits and controls the amount of acid pumped by pump 38.

The elements directly involved in the automatic control of the pH in the waste slurry are the pH sensors 45A–45E submerged in the waste slurry, the monitor and control module 47 and the acid pump 38. Electrical signals from sensors 45A–45E which are proportional to the pH level of the waste slurry are delivered by control line 46 to monitor and control module 47. Monitor and control module 47 compares the electrical signals corresponding to the pH level of the waste slurry with a reference level and controls the pumping rate of acid pump 38 as necessary to maintain the pH at the desired level. Additional pH sensors 35 and 40 which are located upstream and downstream, respectively, from pump 38 in pipe 36 provide an additional monitoring capability for use by service personnel. Signals from sensors 35 may also have utility in connection with the automatic control function as, for example, to provide a safety cutout function in the event of equipment malfunctions which might call for the shut-down of acid pump 38.

The use of sulphuric acid for the limitation of ammonia generation is preferred over the use of muriatic (hydro-chloric) acid or chlorine gas because of its significantly lower cost and because it is much less corrosive to the concrete pits. It has already been pointed out, however, that sulphuric acid in contrast to muriatic acid or chlorine gas is not effective in destroying harmful bacteria which contribute to atmospheric contamination through their activity in generating other objectionable and harmful gases. It is particularly desirable, for example, to destroy the so called lactose non-fermenting bacteria proteins group including salmonella which are strong hydrogen-sulphide producers.

Such harmful bacteria can readily be destroyed by ozone which is a strong oxidizing agent. Ozone can accomplish this purpose with no hazard of undesirable by-products.

The use of ozone along with sulphuric acid to accomplish both ammonia control and bacteria kill is thus the preferred process in the practice of this invention. Although the process of the control of the pH rating of the slurry or waste in the pits may be accomplished alone and still fall within the scope of this invention.

The ozone produced by ozone generator 42 is delivered to pipe 41 via exhaust pipe 43 where it is introduced under pressure into the fluid-acid mixture in pipe 41 for delivery into the waste slurry via ports 44A–44J. The ozone carried by the fluid-acid mixture is then dispersed throughout the waste slurry in the pits where it accomplishes its desired bacteria kill. The excess ozone bubbles up from the slurry and passes over the surface of the slots which are also contaminated with animal excreta so that additional bacteria kill is accomplished on these surfaces. An additional air freshening and purifying action is accomplished as the remaining ozone is dispersed into the atmosphere.

A safety interlock 48 connected between pump 28 and acid pump 38 prevents acid pump 38 from operating when pump 28 is inoperative. This is a safety feature incorporated to prevent excessive acid levels in the system in the event a control system failure occurs simultaneously with a failure of pump 28.

Although the drawing illustrates the injection of the $NH_3$ suppressive into the pits at one end thereof, however, it should be recognized that the suppresive may be injected into the pits at any one or more places along its length.

When utilizing the animal waste for its residual nutritive content by converting it into nutritious and palatable livestock feed supplements the solids deposited on the top of pile 33 are moved slowly from the top of the bottom of the pile as such solids are continuously added at the top and removed at the bottom through an exit 50 diagrammatically shown in FIG. 4. During the course of their travel from top to bottom of a fermenter tower or pile 33, the solid wastes are broken down into protein and other valuable minerals through the fermenting action of thermophilic bacteria which thrive at the controlled elevated temperatures held inside the pile. The maintenance of the controlled elevated temperature in the range of 130° to 180° Fahrenheit also destroys by pasteurization or partial sterilization all harmful bacteria which are detrimental to the health of livestock or humans.

The product of the fermenter tower or pile 33 is thoroughly dried by aeration in dropping on pile 33 or may be directed as shown in FIG. 4 to a dehydrator or dryer 51 from whence the product from the pile or dryer may be carried to storage bins (not shown) where they are directed into mixer 52. At this point, they may be combined with appropriate quantities of other feed supplements, if so desired, including such ingredients as grain, pulp, tallow, molasses, etc.

The output 53 of mixer 52 is measured by scales 54 and deposited in mixer 55 where it may be combined as desired with hay and/or other ingredients or with additional supplements 56 and deposited on a truck or delivered directly as a balanced ration to cattle enclosure 10 or to feeding stations for swine or other livestock. A silo 57 is also provided to serve as storage of the excess output of mixer 52.

It should be recognized, as shown in FIG. 4, that the solid or fibrous output from press 21 may be transferred directly to a silo 58 in the semi dry or wet stage where it may be stored in a sealed, controlled atmosphere for later use. After storage in a limited or controlled atmosphere, it may be transmitted directly to the scales and feedlot, as shown, or it may be mixed with grain, pulp, tallow, molasses, etc., and then transmitted to the scales and feedlot for refeeding purposes.

Another advantage of the method and apparatus disclosed is that they are as effective on the processing of paunch wastes of the livestock as their excreted wastes.

While the principles of the invention have now been made clear in an illustrative embodiment, there will be immediately obvious to those skilled in the art many modifications of structure, arrangement, proportions, elements, materials and parts used in the practice of the invention, and otherwise, which are particularly adapted for specific environments without departing from these principles. The appended claims are therefore intended to cover and embrace any such modifications within the limits only of the true spirit and scope of the invention.

What is claimed is:

1. A process for inhibiting the generation of ammonia from animal excreta through the control of the pH level of the excreta under the animal in a feedlot comprising the steps of:

collecting the exereta underneath the animal in a feedlot;

diluting the excreta with a chemical additive to control the pH rating of the excreta, periodically removing a part of the excreta from underneath the animal while maintaining said control of the pH rating of the excreta.

2. The process for inhibiting the generation of ammonia set forth in claim 1 wherein:

the excreta is kept at an acidity condition.

3. The process for inhibiting the generation of ammonia set forth in claim 1 wherein:

the excreta is kept at an acidity condition between a 5.5 and 6 pH level.

4. The process for inhibiting the generation of ammonia set forth in claim 1 wherein:

the chemical additive comprises an acid.

5. The process for inhibiting the generation of ammonia set forth in claim 1 wherein:

said chemical additive comprises a solution of sulphuric acid.

6. The process for inhibiting the generation of ammonia set forth in claim 1 wherein:

said chemical additive comprises a solution of hydrochloric acid.

7. The process for inhibiting the generation of ammonia set forth in claim 1 in further combination with the step of:

diluting the excreta with ozone to control bacteria in the excreta.

8. The process for inhibiting the generation of ammonia set forth in claim 1 in further combination with the step of:

mixing ozone with said chemical additive to control bacteria associated with the generation of other gases produced by said excreta during its aging in the feedlot.

9. A process for inhibiting the generation of ammonia and other noxious gases from animal excreta through the control of the pH level of the excreta under the animal in a pit in the floor of a feedlot comprising the steps of:

collecting the manure in the pit underneath the animal in a feedlot, diluting the excreta with a chemical additive to control the pH rating of the excreta, and periodically scraping the pit to remove at least a part of the slurry of the excreta from the pit while maintaining said control of the pH rating of the excreta.

10. The process for inhibiting the generation of ammonia and other noxious gases from animal excreta set forth in claim 9 in further combination with the step of:

maintaining a bed of liquid slurry of the excreta in the pit having a pH rating of an acidity condition at all times, and scraping the pit periodically to remove excess excreta therefrom while maintaining at all times the pH rating of the excreta in the liquid slurry of the pit.

11. The process for inhibiting the generation of ammonia and other noxious gases from animal excreta set forth in claim 10 in further combination with the step of:

adding ozone to the chemical additive prior to diluting the excreta for controlling bacteria in the excreta.

12. A process for inhibiting the generation of noxious gases from animal excreta through the control of the excreta under the animal in a feedlot comprising the steps of:

collecting the manure underneath the animal in a feedlot, diluting the excreta with ozone to control bacteria growth in the excreta, and periodically removing a part of the excreta from underneath the animal while maintaining said control of the bacteria growth of the excreta.

13. Apparatus for collecting and processing animal waste comprising:

a pen for containing livestock having a slotted floor, a trough arranged below said floor for receiving animal waste dropped therein by the animals housed in said pen, means for diluting the animal waste with a chemical additive for controlling a pH rating of the waste, and means for periodically removing the animal waste from said trough while maintaining a liquid slurry at all times at the bottom of said trough.

14. The apparatus set forth in claim 13 wherein: said chemical additive comprises an acid.

15. The apparatus set forth in claim 13 wherein: said chemical additive comprise an acid solution for maintaining the diluted animal waste at a pH level less than 7.

16. The apparatus set forth in claim 13 wherein: said chemical additive comprises an acid solution mixed with ozone.

17. The apparatus set forth in claim 13 wherein: said chemical additive comprises a solution of sulphuric acid.

18. The apparatus set forth in claim 13 wherein: said chemical additive comprises a solution of hydrochloric acid.

19. Apparatus for collecting and processing animal waste comprising:

a pen for containing livestock having a slotted floor, a trough arranged below said floor for receiving animal waste dropped therein by the animals housed in said pen, means for periodically removing the animal waste from said trough to a holding tank, a holding tank for diluting the waste, separating means for removing the solids from the liquids of the diluted waste received from said holding tank, press means for receiving and compressing the solids from said separating means, drying means for receiving the solids from said press means for pasteurization thereof, and means for mixing an acid with at least a part of the liquids received from said separating means and returning it to said trough below said floor for maintaining a slurry of the animal waste at an acid condition for suppressing the generation of ammonia in the waste.

20. The apparatus set forth in claim 19 wherein: said acid comprises sulphuric acid.

21. The apparatus set forth in claim 19 wherein: said acid comprises hydrochloric acid.

\* \* \* \* \*